United States Patent
Sickels

(10) Patent No.: US 6,951,166 B1
(45) Date of Patent: Oct. 4, 2005

(54) UNIT FOR PREPARING BABY FORMULA

(76) Inventor: Gary C. Sickels, 645 Ranchwood Dr., Greenville, TX (US) 75402

( * ) Notice: Subject to any disclaimer, the term of this patent is extended or adjusted under 35 U.S.C. 154(b) by 125 days.

(21) Appl. No.: 10/859,724

(22) Filed: Jun. 4, 2004

(51) Int. Cl.[7] ............................. A23L 1/00; A47J 27/00; A47J 43/27; B01F 9/00; F24H 1/18
(52) U.S. Cl. .............................. 99/344; 99/348; 99/483; 222/146.5; 222/129.4; 366/144; 366/146
(58) Field of Search ........................ 99/281, 287, 275, 99/323.3, 326–333, 348, 344, 352–355, 452, 453, 467–470, 483; 141/69, 99, 100; 219/386, 432, 689, 710; 222/146.1, 146.5, 146.2, 129.4, 166.1, 129; 392/442, 446, 444, 451; 366/144–146, 279, 314; 426/465, 517, 658; 215/11.1, 11.4; 165/80.5; 374/150; 126/261

(56) References Cited

U.S. PATENT DOCUMENTS

| | | | | | |
|---|---|---|---|---|---|
| 2,784,879 | A | * | 3/1957 | Fischer | .......................... 165/63 |
| 3,200,997 | A | * | 8/1965 | Creswick | ................... 222/145.5 |
| 3,658,122 | A | | 4/1972 | Kalyk | |
| 4,694,740 | A | * | 9/1987 | Daloz | ......................... 99/323.3 |
| D308,154 | S | | 5/1990 | Tow | |
| 5,208,896 | A | | 5/1993 | Katayev | |
| 5,315,084 | A | * | 5/1994 | Jensen | ........................ 219/689 |
| 5,797,313 | A | | 8/1998 | Rothley | |
| 5,970,847 | A | * | 10/1999 | Saltzman | ....................... 99/287 |
| 6,170,386 | B1 | * | 1/2001 | Paul | ............................. 99/281 |
| 6,411,777 | B2 | | 6/2002 | Roberson | |
| 6,711,990 | B1 | * | 3/2004 | Harrison | ....................... 99/348 |

* cited by examiner

*Primary Examiner*—Timothy F. Simone
(74) *Attorney, Agent, or Firm*—Donald R. Schoonover

(57) ABSTRACT

A unit heats water to a specified temperature and then alerts a user or automatically mixes the heated water with dry baby formula and dispenses the mixture into a baby bottle.

1 Claim, 2 Drawing Sheets

UNIT FOR PREPARING BABY FORMULA

BACKGROUND OF THE INVENTION

1. Field of the Invention

The present invention relates to the general art of food preparation, and to the particular field of preparing baby formula.

2. Discussion of the Related Art

Many parents and child care providers find it difficult to properly prepare formula for a baby. The liquid temperature must be very close to a specified range for the prepared formula to be proper for the child.

In the past, a person would simply place the prepared formula on their skin to determine if it was the proper temperature. Other methods include placing a thermometer in contact with the formula.

While these methods have worked in the past, they have several disadvantages. For example, the temperature measurements are not exact and may be far away from an ideal range. This is especially true if the child care giver is sleepy, such as may happen if the feeding occurs late at night.

Therefore, there is a need for a unit that can automatically prepare baby formula that is within a specified temperature range.

Another disadvantage to the above-described method of preparing baby formula is the requirement for heating water to the proper temperature. Many people use a microwave to heat the water or heat the water in a boiler on a stove. Neither of these methods is entirely satisfactory and each has its own disadvantages. For example, heating water in a microwave may have some dangers associated therewith, and heating water on a stove may take too long.

Therefore, there is a need for a unit that can efficiently and safely prepare baby formula that is within a specified temperature range.

Yet another problem with preparing formula as described above includes the inaccuracy associated therewith. That is, too much or too little water may be added to the formula thereby vitiating some of the advantages of a premixed amount of formula.

Therefore, there is a need for a unit that can automatically prepare baby formula that is within a specified mixture range.

PRINCIPAL OBJECTS OF THE INVENTION

It is a main object of the present invention to provide a unit that can automatically prepare baby formula that is within a specified temperature range.

It is another object of the present invention to provide a unit that can efficiently and safely prepare baby formula that is within a specified temperature range.

It is another object of the present invention to provide a unit that can automatically prepare baby formula that is within a specified mixture range.

SUMMARY OF THE INVENTION

These, and other, objects are achieved by a baby formula preparation unit that includes a water-containing and heating portion, a dry formula-accommodating portion, and a mixing system. The heating portion of the unit is controlled to heat the water to a specified temperature. Mixing of the pre-heated water with dry formula is either automatically performed by the unit or effected by a user pressing a button when alerted that the water is at the desired temperature. The mixed formula and water is dispensed into a baby bottle.

Using the baby formula preparation unit embodying the present invention will permit a child care giver to serve the child the prepared formula at a temperature that is well within a desired range and which has proportions that are well within specified ranges. The unit is efficient and accurate and thus makes preparation of such formula efficient, safe and accurate.

BRIEF DESCRIPTION OF THE DRAWING FIGURES

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a unit 10 for preparing baby formula to serve to a baby.

Figure 1:
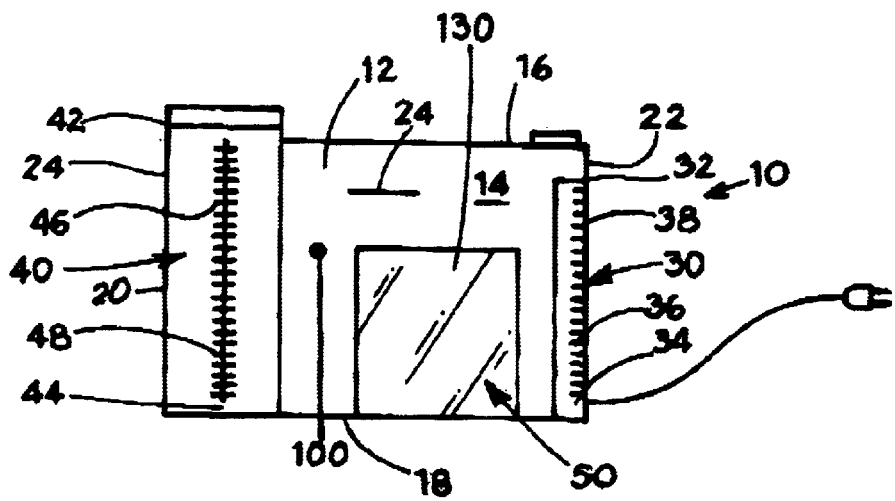
FIG. 1 is a front elevational view of a unit for preparing baby formula for a baby embodying the present invention.
Figure 2:
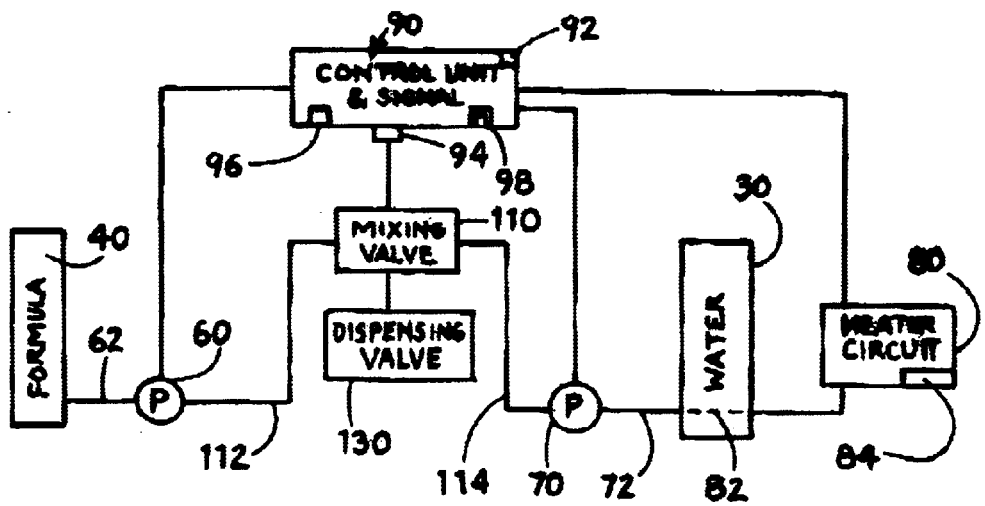
FIG. 2 is a schematic of the unit shown in FIG. 1.

Unit 10 comprises a housing 12 which includes a first face 14 that is a front face when the housing 12 is in a use orientation such as shown in FIG. 1. Housing 12 further includes a first end 16 that is a top end when housing 12 is in the use orientation, a second end 18 that is a bottom end when housing 12 is in the use orientation, a first side 20, a second side 22, and a transverse axis 24 that extends between the first side 20 and the second side 22.

A water-containing portion 30 has an inlet area 32 which receives water from an outside source such as a faucet or the like, an outlet area 34, and a translucent or transparent section 36. Measuring markings, such as indicia 38, are located on the translucent or transparent section 36. The water-containing portion 30 is located adjacent to the first side 20 of the housing 12.

A dry baby formula-containing portion 40 has an inlet area 42 through which dry formula powder can be poured, an outlet area 44 and a translucent or transparent section 46 through which the dry formula can be viewed. Measuring markings, such as indicia 48, are located on the translucent or transparent section of the dry baby-formula containing portion 40. The dry baby formula-containing portion 40 is located on second side 22 of the housing 12.

A baby bottle-filling portion 50 is located between the water-containing portion 30 and the dry baby formula-containing portion 40. A baby bottle is inserted into portion 50 to be filled with formula and water.

A dry baby formula pump 60 is fluidically connected to the outlet area 44 of the dry baby formula-containing portion 40 by a conduit 62 to move dry formula out of portion 40.

A water pump 70 is fluidically connected to the outlet area 34 of the water-containing portion 30 by a conduit 72 to move heated water out of the portion 30.

Figure 3:
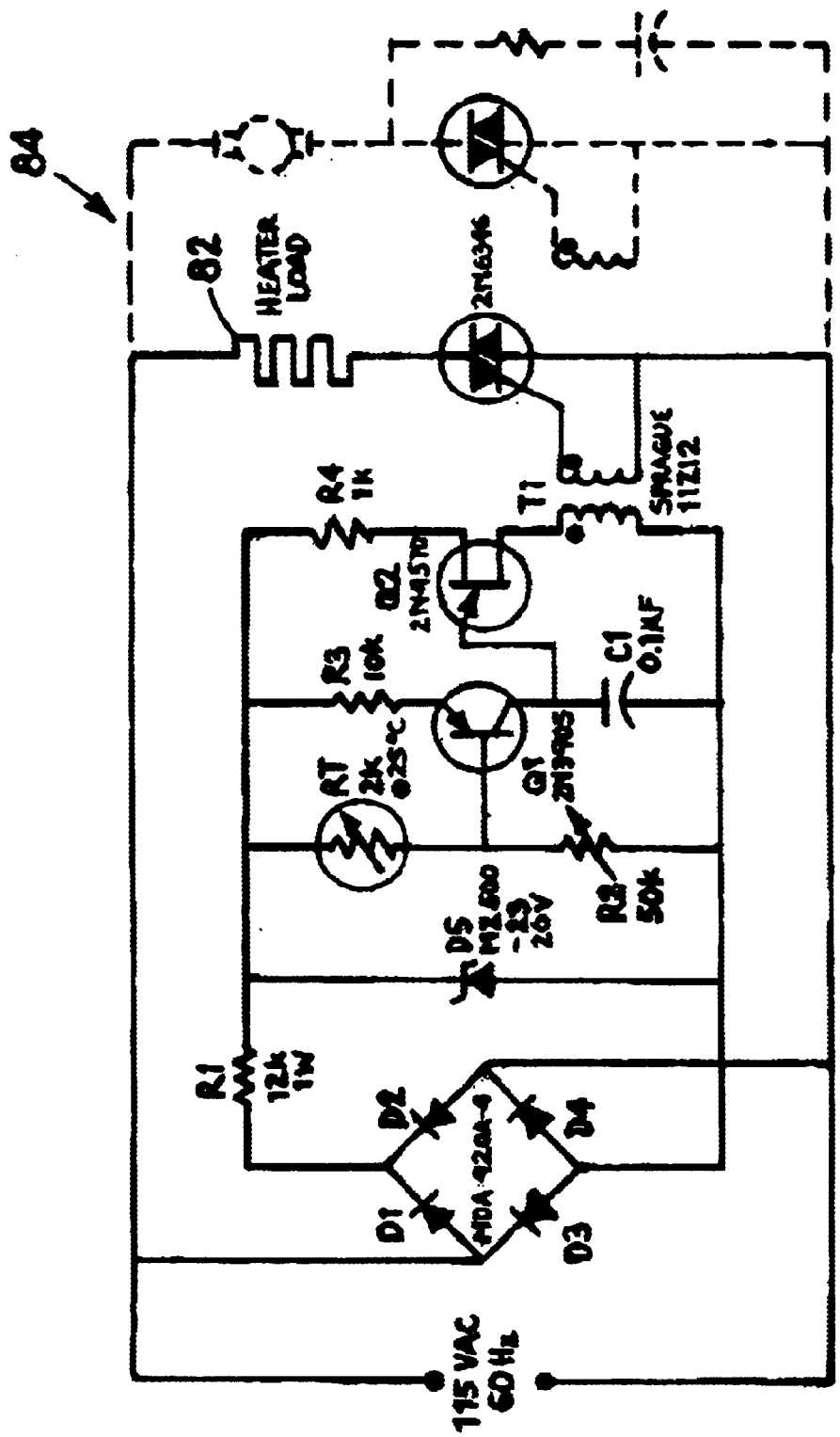
FIG. 3 is a circuit diagram for a temperature controlled heater circuit that can be included in the unit shown in FIG. 1.

A water heater circuit 80 is associated with water-containing portion 30 and includes a water heater element 82 in the water-containing portion 30 to be in fluid contact with water contained in the water-containing portion 30. Circuit 80 further includes a control circuit 84 that is electrically connected to the water heater element 82 to control operation of the water heater element 82. A control circuit is shown in FIG. 3 to control operation of the heater element 82 in accordance with a temperature set by a user. This temperature is commonly 98.6° F.

A control circuit 90 is electrically connected to control circuit 84 of the water heater circuit 80 and to the dry baby formula pump 60 and to the water pump 70. Control circuit 90 includes an alarm element 92 that is activated when water in the water-containing portion 30 is at a specified temperature and a valve-activating element 94 that is connected to the control circuit 84 of the water heater circuit 80. The valve-activating element 94 can be connected to an automatic system 96 that automatically dispenses the mixture once the water temperature reaches the set temperature, or can include a manually activated system 98 that is manually activated when the user desires the mixture to be dispensed. The manual system 98 includes a manually operated-dispensing button 100 on the housing 12.

A mixing valve 110 is electrically connected to the control circuit and is fluidically connected to the dry baby formula pump 60 by a conduit 112 and to the water pump 70 by a conduit 114 to receive dry baby formula and heated water and mix the dry baby formula with the heated water when activated by the control circuit.

A dispensing valve 130 is fluidically connected to the mixing valve 110 to receive mixed heated water and dry baby formula from the mixing valve 110 and dispense the mixed heated water and dry baby formula into the baby bottle-filling portion 50 to be dispensed into a baby bottle located in the filling portion 50.

The unit 10 includes an internal heater system which alerts the user when the water is within a specified temperature range and can either automatically mix the heated water with formula or allow the user to manually effect the mixing. Thus, the unit 10 is efficient and safe.

It is understood that while certain forms of the present invention have been illustrated and described herein, it is not to be limited to the specific forms or arrangements of parts described and shown.

What is claimed and desired to be secured by Letters Patent is as follows:

1. A unit for preparing baby formula to serve to a baby comprising:
   a) a housing which includes a first face that is a front face when said housing is in use orientation, a first end that is a top end when said housing is in the use orientation, a second end that is a bottom end when said housing is in the use orientation, a first side, a second side, and a transverse axis that extends between the first side and the second side;
   b) a water-containing portion which has an inlet area, an outlet area, a translucent or transparent section, and measuring markings on the translucent or transparent section, said water-containing portion being located adjacent to the first side of said housing;
   c) a dry baby formula-containing portion which has an inlet area, an outlet area, a translucent or transparent section and measuring markings on the translucent or transparent section of said dry baby formula-containing portion, said dry baby formula-containing portion being located on the second side of said housing;
   d) a baby bottle-filling portion located between said water-containing portion and said dry baby formula-containing portion;
   e) a dry baby formula pump fluidically connected to the outlet area of said dry baby formula-containing portion;
   f) a water pump fluidically connected to the outlet area of said water-containing portion;
   g) a water heater circuit which includes a water heater element in said water-containing portion to be in fluid contact with water contained in said water-containing portion, and a first control circuit that is electrically connected to the water heater element to control operation of the water heater element;
   h) a second control circuit that is electrically connected to the first control circuit of said water heater circuit and to said dry baby formula pump and to said water pump, said second control circuit including an alarm element that is activated when water in said water-containing portion is at a specified temperature and a valve-activating element that is connected to the first control circuit of said water heater circuit;
   i) a mixing valve that is connected to said second control circuit and is fluidically connected to said dry baby formula pump and to said water pump to receive dry baby formula and heated water and mix the dry baby formula with the heated water when activated by said second control circuit; and
   j) a dispensing valve fluidically connected to said mixing valve to receive mixed heated water and dry baby formula from said mixing valve and dispense the mixed heated water and dry baby formula into said baby bottle-filling portion.

* * * * *